ALTERNATING CURRENT GATE

Filed Aug. 10, 1953

INVENTOR
J. N. SHIVE
BY [signature]
ATTORNEY

United States Patent Office 2,790,088

Patented Apr. 23, 1957

2,790,088

ALTERNATING CURRENT GATE

John N. Shive, Gillette, N. J., assignor to Bell Telephone Laboratories, Incorporated, New York, N. Y., a corporation of New York Application August 10, 1953, Serial No. 373,406

9 Claims. (Cl. 250—211)

This invention relates to gating circuits and more particularly to such circuits employing photoconductive devices which transfer electrical energy under the control of light energy incident thereon.

A gating circuit is characterized as a circuit to be positioned between a source of electrical current and a load device utilizing such current, and which permits the transmission of the electrical current applied thereto during a given time interval in accordance with a separate control medium. Inasmuch as the circuit transmits current only during the given time intervals, it is said to constitute a switch, or a "gate" which is "on" during the given intervals and "off" at all other times.

In circuits in accordance with this invention, the "gating" control of signals may be achieved advantageously by utilizing the photoconductive characteristics of a junction semiconductor translating device. Illustrative devices of this nature are shown in Patent 2,402,622, granted June 25, 1946, to R. S. Ohl, and Patent 2,641,713, granted June 9, 1953, to J. N. Shive. As is disclosed in the above-identified patents, a semiconductor translating device of the barrier or junction type comprising contiguous regions of P-type and N-type conductivity material exhibits photosensitive effects under the influence of light. More specifically, as is well known, in a junction type semiconductor translator having ohmic terminal connections to each of the zones the absorption of light by the body alters the energy levels within the body whereby flow of charge carriers between the terminals is enhanced. Thus the light alters the effective impedance of the body and provides a control action upon the current flow between the terminals.

In one illustrative embodiment of the invention, there is provided a four terminal gating circuit adapted to be positioned between a source of alternating current signals and a useful output load. The gating circuit comprises a $\pi$ network having fixed impedance in the shunt arms, and two series branches one of which contains an asymmetrically conducting element which may take the form of a P–N junction-type translator having a direct current biasing source. Or, as hereinafter disclosed the asymmetrically conductive device may comprise a semiconductive element of P–N–P or N–P–N configuration thereby enabling the omission of a direct current biasing source. As is well known in the art, such devices or photocells enable the passage of current in both directions when illuminated but in only one direction, termed the forward direction, when the cell is in the dark condition. With a reverse bias voltage applied to the photosensitive element and for given values of the impedances of the shunt branches the magnitude of the alternating current signal at the output terminals is dependent upon the impedance of the series branch containing the photocell. This impedance in turn is dependent upon the amount of light energy incident upon the element, being high for the dark condition and low for the light, thereby providing gating control of the circuit. Additionally, therefore, an embodiment of this invention includes a source of light incident upon the photosensitive element and actuated by suitable means representative of the control phenomena. For example, the gate of this invention may be actuated by natural light from the sun focused by optical means upon the photocell thereby producing an "on" condition of the circuit during daylight hours or any portion thereof. Power ratios of the order of 45 decibels are representative of the light-dark discrimination obtainable with this specific embodiment.

Other light sources subject to a variety of controls may be employed advantageously. For example, an electric lamp which is energized to indicate the existence or nonexistence of a certain condition may provide the gating control of the circuit. Or masks of suitable form may be utilized to interrupt the incidence of light from a constant source upon the photosensitive element.

In another illustrative embodiment of this invention, a four terminal gating circuit of essentially $\pi$ network configuration is provided. As in the above-described embodiment, one series branch includes a photoresponsive device positioned between the terminal points of the shunt arms. The shunt branch nearest the input terminal also contains a photosensitive element and the other shunt branch includes a fixed impedance. The D.-C. biasing means may be inserted in the other series branch, or if it is desired to keep the A.-C. signal out of the D.-C. bias supply, the latter may be placed in an additional branch shunting the series photocell.

In this latter embodiment, gating is achieved by alternately illuminating the two photoresponsive elements by means of separately-controlled light sources. In other words, the gate is "off" when the series photocell is dark and the shunt cell is illuminated and "on" when the reverse condition exists. This specific embodiment enables a greater "on-off" discrimination considerably above the value noted for the first-noted specific circuit.

It is an object of this invention to enable control of alternating currents by photoresponsive means.

It is a further object of this invention to simplify the construction and improve the performance of alternating current gating circuits.

One feature of this invention pertains to facile control enabled by the photoconductive devices.

A further specific feature resides in the extremely low impedance path which exists when the gate is on as a result of the advantageous use of junction-type translators.

Another feature of this invention is the efficient regulation and stability enabled by the $\pi$ configuration in which the light responsive device is positioned with associated elements.

These and other objects and features of the invention will be understood more clearly and fully from the following detailed description taken in connection with the drawing in which.

Figures 1, 2, 3, 3A:
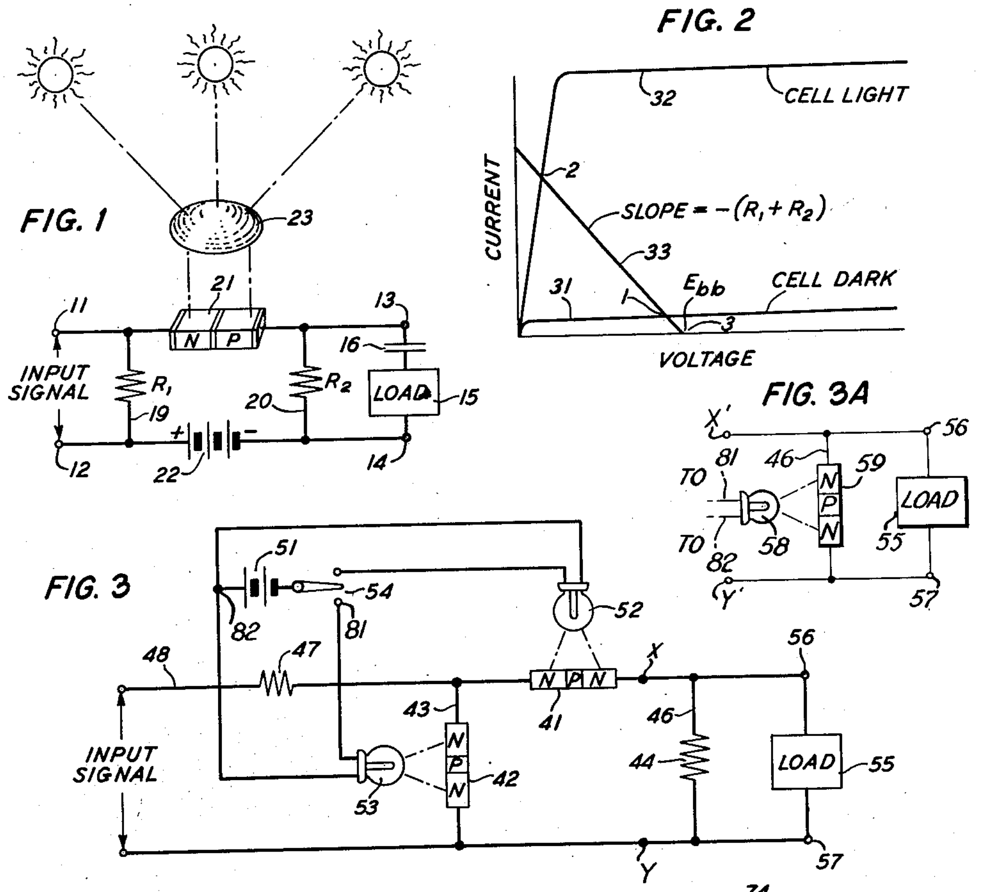
Fig. 1 is in part a perspective view and in part a circuit diagram depicting one illustrative embodiment of this invention.
Fig. 2 is a graph representative of the operation of the device illustrated in Fig. 1.
Figs. 3, 3A and 4, similar to Fig. 1, portray other illustrative embodiments of this invention.

Referring now to Fig. 1, there is shown diagrammatically a circuit in $\pi$ form having input terminals 11 and 12 and output terminals 13 and 14. The alternating signal being gated is impressed across the input terminals as indicated. A load 15 which is adapted to receive the gated signal is connected to the output terminals. The condenser 16 indicates that the load so inserted is purely an alternating current element. Within the operative section of the circuit are shown resistors $R_1$ and $R_2$ in respective shunt branches 19 and 20. A P–N junction photocell 21 is shown in perspective connected in one series branch by ohmic type leads to the respective conductivity regions. In the other series branch is a direct current source 22 of such polarity as to bias the photocell in the reverse direction. Associated with the circuit is an optical system utilizing, for example, the natural illumination of the sun to actuate the photocell. Such system may comprise a diffuser 23 for concentrating the illumination upon the photo-translator 21. Thus, in this specific embodiment the gate circuit will be "on" during daylight and "off" at night.

A better understanding of the mode of operation of the circuit of Fig. 1 may be had by referring to Fig. 2. Typical characteristic curves of a junction translator are shown on coordinates of current and voltage. As indicated, curve 31 depicts the relation of current to voltage for the cell in the dark condition and curve 32 for the illuminated condition. The load line 33 is drawn appropriate to the series resistance ($R_1+R_2$) on the photocell circuit and to the bias supply of value $E_{bb}$ represented by the point 3. In a specific embodiment of this invention satisfactory results have been attained using $$R_1=R_2=51{,}000$$

ohms. When the photocell is in the dark, the quiescent operating point of the photocell circuit is given by point 1 where the load line 33 intersects the dark current characteristic curve 31. In the typical embodiment of this invention, the alternating current impedance of the photocell for small-signal voltage excursions about this point is of the order of 10 megohms. Under these conditions only a fraction of the input signal is transferred to the second shunt resistance 20. Thus, the gate circuit is effectively closed to the transmission of an alternating current signal.

When the photocell is sufficiently illuminated, the quiescent operating point of the photocell circuit moves to point 2 in the figure, where the alternating current impedance for this typical embodiment may be of the order of 100 ohms. This decreases the series impedance relative to the shunt impedances of the $\pi$ circuit and transfers a larger fraction of the input signal to the second shunt resistance 20. Thus, the impressed signal will be transmitted to the alternating current load through the effectively opened gate.

As indicated, the embodiment of Fig. 1 may be used advantageously to enable the transmission of an alternating current signal during daylight hours or, by incorporating suitable masking means within the optical light-gathering system, during a selected portion of the daylight hours.

Fig. 3 depicts a circuit of somewhat similar configuration and operation representing a further specific embodiment of applicant's invention.

This circuit of basically $\pi$ form utilizes two light-responsive N–P–N junction devices 41 and 42. A direct current source for reverse biasing is thereby eliminated because each of the junctions of the pair is conductive in only one direction. It is to be understood that P–N–P junction devices are equally useful in the circuit of this invention. One photocell 41 is shown in one series branch of the circuit while the other junction phototranslator 42 appears in the first shunt branch 43. A suitable resistance 44 is shown in the second shunt branch 46 and an input resistance 47 in the input lead 48. A lighting circuit having a direct current supply 51 and lamps 52 and 53 is arranged with a double-throw switch 54 so that the lamps are separately and alternatively illuminable. The switch 54 may lend itself advantageously to actuation by an independent means. The circuit functioning similarly to that of Fig. 1 enables however a greater degree of discrimination between the on and off conditions of the gate. Hence, the gate is effectively closed when the series cell 41 is dark and the shunt cell 42 is lighted. Conversely, when the series cell 41 is lighted and the shunt cell 42 is dark a considerable fraction of the input signal is transmitted to the resistance 44 and to the alternating current load device 55 across output terminals 56 and 57.

The specific embodiment of Fig. 3 may be modified by substituting the partial circuit shown in Fig. 3A including an additional photosensitive unit 59 for the portion of the circuit to the right of points $x$ and $y$. This additional photocell 59 would then be illuminated by the lamp 58 connected in parallel with the lamp 53 and would enable an additional improvement in the "on"-"off" discrimination of the gate.

Figure 4:
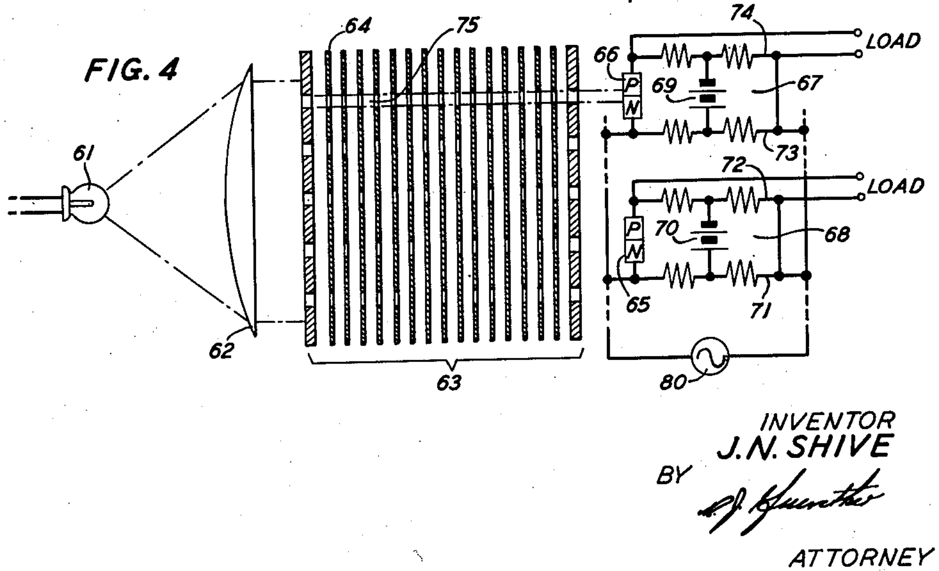

Fig. 4 represents a further specific embodiment wherein the features of applicant's invention may be utilized. Indicated generally, and in simplified form is a masking arrangement of the type commonly termed a card translator and well known in the telephone switching art as disclosed, for example, in Patent 2,558,577 issued June 26, 1951, to O. Myers.

Although only two gates each containing a photocell in alignment with a single light channel of the translator are shown it is understood that a separate junction photocell with associated gate circuit is located so as to be actuated by each individual light channel. There is shown a light source 61 of sufficient intensity to properly excite photocells receiving light therefrom. An optical focusing and collimating system is indicated generally by the lens 62 which concentrates the illumination upon the face of the translator assembly 63 containing a bank of specially perforated steel cards 64. Juxtaposed to the translator are shown two of the junction-type semiconductor photocells 65 and 66. The gate circuits 67 and 68 are of the general $\pi$ configuration having a single input source from an alternating current tone generator 80. In a modification of the circuit of Fig. 1, the direct current biasing sources 69 and 70 are shown connected between the midpoints of the respective shunt branches 71 and 72, and 73 and 74 thereby eliminating the alternating current signal from the direct current supply. It is clear that by an alternative arrangement a single direct current supply may suffice for all of the gates.

In the operation of this embodiment a specific arrangement of the cards 64, accomplished by electro-mechanical means not shown sets up the channel 75 illuminating the cell 66. Thereupon, the gating circuit 67 associated with this photocell transfers to the "on" condition and transmits the tone signal to a separate load device not shown. Among the advantages achieved by the use of applicant's unique alternating current gate in this specific embodiment over prior art direct current photocell gates is the elimination of the need for a mechanical light chopper in conjunction with the light source to produce an alternating output signal.

Although the invention has been described in terms of particular circuit configurations and elements it will be obvious to those skilled in the art that various modifications may be made without departing from its scope and spirit. For example, the $\pi$ configuration may be utilized including a photosensitive element in both series branches or in a single series branch and both shunt branches.

What is claimed is:

1. An alternating current gate circuit comprising a pair of input terminals, a pair of output terminals, a first shunt connection including an impedance between said input terminals, a second shunt connection including an impedance between said output terminals, first connecting means including an asymmetrically conducting light responsive semiconductor device between one of said input terminals and one of said output terminals, means for controllably illuminating said device, and second connecting means between the other of said input and output terminals.

2. An alternating current gate circuit as defined in claim 1 in which said semiconductor device comprises a body of semiconductive material having therein an intermediate zone of one conductivity type between and contiguous with a pair of zones of the opposite conductivity type, said pair of zones having circuit connections thereto.

3. An alternating current gate circuit in accordance with claim 1 in which said asymmetrically conducting device comprises a P–N junction semiconductor photocell and direct current means biasing said photocell in the reverse direction.

4. An alternating current gate circuit in accordance with claim 1 in which the impedance of said first shunt connection comprises an asymmetrically conducting light responsive semiconductor device and means for illuminating said shunt-connected device when said first connected device is dark.

5. An alternating current gate circuit as defined in claim 4 in which each of said semiconductor devices comprises a body of semiconductive material having therein an intermediate zone of one conductivity type between and contiguous with a pair of zones of the opposite conductivity type, said pair of zones having circuit connections thereto.

6. An alternating current gate circuit as defined in claim 4 in which each of said asymmetrically conducting devices comprises a P–N junction photocell and direct current means biasing said phootcell in the reverse direction.

7. An alternating current gate circuit in accordance with claim 1 in which both said shunt impedances comprise asymmetrically conducting light responsive semiconductor devices and means for illuminating said shunt-connected devices when said first connected device is dark.

8. An alternating current gate circuit as defined in claim 7 in which each of said semiconductor devices comprises a body of semiconductive material having therein an intermediate zone of one conductivity between and contiguous with a pair of zones of the opposite conductivity type, said pair of zones having circuit connections thereto.

9. An alternating current gate circuit as defined in claim 7 in which each of said asymmetrically conducting devices comprises a P–N junction photocell and means biasing said photocell in the reverse direction.

References Cited in the file of this patent

UNITED STATES PATENTS

| | | |
|---|---|---|
| 2,486,776 | Barney | Nov. 1, 1949 |
| 2,623,105 | Shockley et al. | Dec. 23, 1952 |
| 2,641,713 | Shive | June 9, 1953 |